Figure 3:
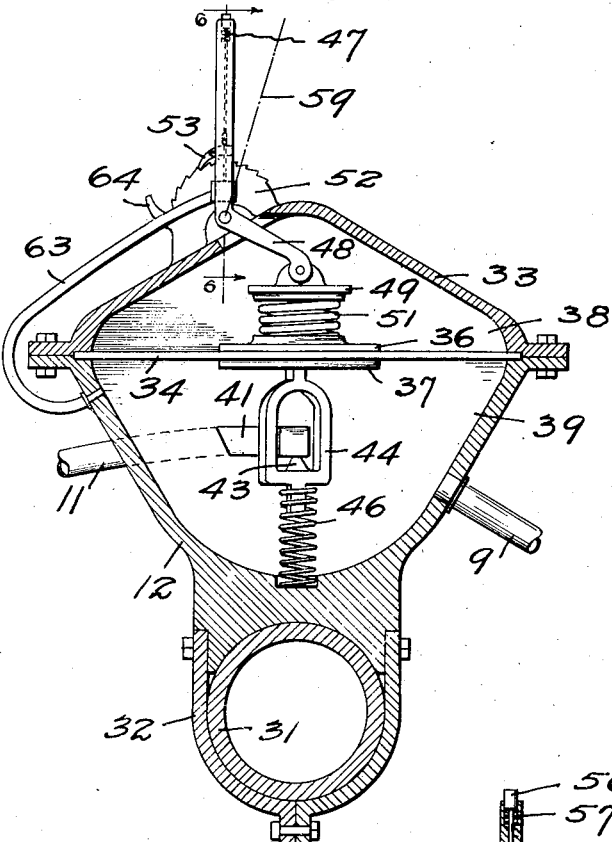

March 24, 1925.  1,530,501
G. S. LANE
BRAKE APPARATUS
Filed May 26, 1920  2 Sheets-Sheet 1
Fig. 1.
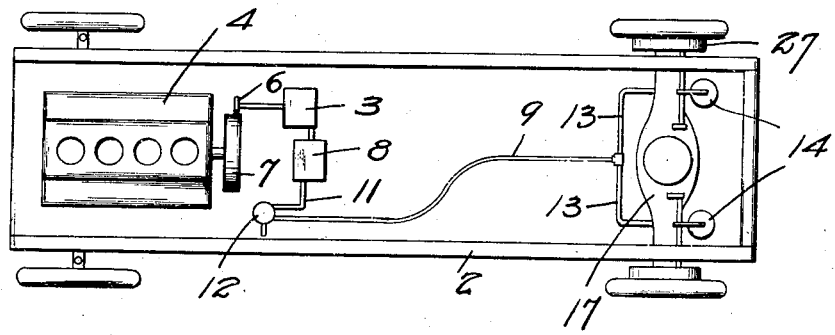
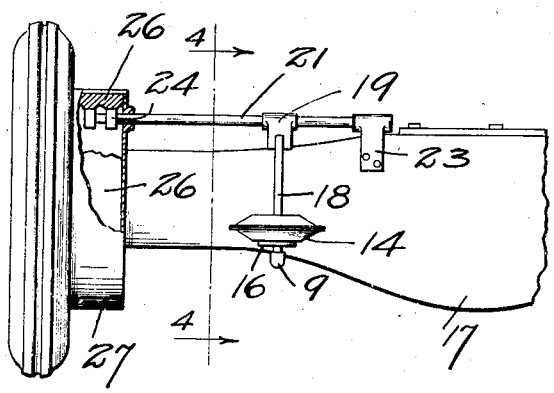
Fig. 2.
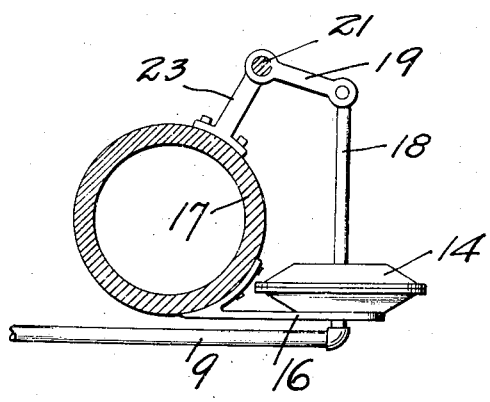
Fig. 4.
WITNESS
H. A. Sherburne
INVENTOR
George S. Lane.
BY
White Prost & Evans
his ATTORNEYS March 24, 1925.

G. S. LANE

BRAKE APPARATUS

Filed May 26, 1920

1,530,501

2 Sheets-Sheet 2

WITNESS
H. A. Sherburne

INVENTOR
George S. Lane
BY
White Prott & Evans
his ATTORNEYS

Patented Mar. 24, 1925.

1,530,501

UNITED STATES PATENT OFFICE.

GEORGE S. LANE, OF SAN FRANCISCO, CALIFORNIA, ASSIGNOR, BY MESNE ASSIGNMENTS, TO THE WESTINGHOUSE AIR BRAKE COMPANY, OF WILMERDING, PENNSYLVANIA, A CORPORATION OF PENNSYLVANIA.

BRAKE APPARATUS.

Application filed May 26, 1920. Serial No. 384,436.

*To all whom it may concern:*

Be it known that I, GEORGE S. LANE, a citizen of the United States, and a resident of the city and county of San Francisco and State of California, have invented a new and useful Brake Apparatus, of which the following is a specification.

My invention relates to vehicle brakes and especially to pneumatically operated brakes for automobile trucks.

One of the objects of the invention is to provide a device with which the setting of the brakes may be so nicely regulated that sudden seizure of the drums is eliminated, the application or release of the power being subject to that close control necessary for safe and economical operation. Another object of the invention is to provide a brake controlling mechanism in which a plurality of brakes are all operated with the same degree of force, without the use of mechanical equalizing means, so that unequal and destructive braking is avoided.

Another object is to provide a brake control of the character described in which the power applying means is so closely related to the brake shoes that lost motion, inertia of moving parts and other uncertain factors are obviated.

Another object of the invention is the provision of a valve with which the flow of pressure fluid to the power applying means may be controlled so that a predetermined or preselected maximum pressure may gradually be accumulated in the power applying means. This maximum is variable up to the receiver or tank pressure.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Figure 5:
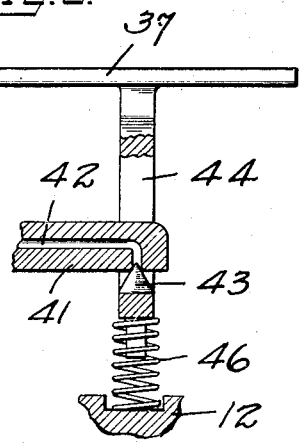
Figure 6:
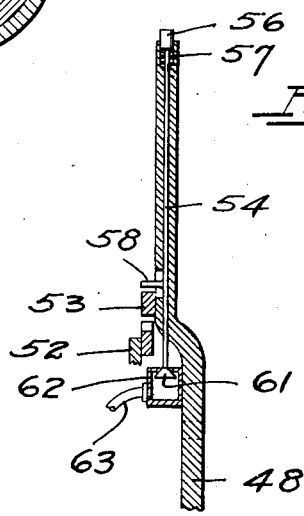

Referring to the drawings:

Fig. 1 is a plan view of an automobile truck including my brake control. Fig. 2 is a rear elevation of the truck axle housing in part, drawn on a larger scale than is Fig. 1. Fig. 3 is a horizontal sectional view of the control valve. Fig. 4 is a vertical sectional view through the axle housing showing the pressure cell in elevation. Fig. 5 is a sectional view of a fragment of the valve. Fig. 6 is a sectional view taken in a plane indicated by the line 6—6 of Fig. 3.

In brakes directly controlled by a hand or foot lever, a very great advantage lies in the capacity for fine graduated control of the pressure exerted upon the braked element, although of course, the limitation imposed in the matter of degree of pressure which it is possible to exert, is the limitation of the usefulness and applicability of such brakes. In brakes operated by fluid pressure, the flow of fluid must be interrupted and the pressure fluid partially exhausted in frequent alterations between periods of pressure and periods of exhaust, or the pressure behind the brakes quickly builds up to full receiver pressure, which results in seizure of the wheels by the brakes, jerky control and an enormous increase in wear on all parts of the vehicle. One of the chief objects of my invention, then, is the provision of brake apparatus in which means are provided for producing gradually and then maintaining a predetermined maximum pressure in the power applying means, such maximum being determined in each braking instance by the driver's knowledge of his load and vehicle, condition of the roadway and other controlling factors. Thus the precise selection of the braking force is as wholly within the driver's control as in the case of a hand or pedal brake, and at the same time, the range of pressure is far greater than is possible in a hand or pedal brake, being limited only by the receiver pressure. My brake apparatus thus is characterized by the power of the fluid pressure brake and the sensitiveness of control of the hand brake.

Arranged on the truck frame 2 is a compressor 3 driven by the engine 4 by means of any suitable connection such as a friction disk 6 bearing on the fly-wheel 7. The compressor delivers air into the storage tank 8, from which it passes into the air line 9 through conductor 11 and manually controlled valve 12 arranged in convenient position near the driver, and preferably on the steering column.

Near the rear of the truck, the air line divides into two branch lines 13, each branch being connected into a diaphragm cell 14, so that the diaphragm may be expanded by the influx of air under pressure from the tank, or contracted by permitting air to exhaust into the atmosphere. Each cell is secured to a bracket 16 fixed on the rear axle housing 17, and a rod 18 operatively connects the diaphragm with the lever arm 19 fixed on the shaft 21. One end of the shaft is journaled in a bracket 23 fixed on the axle housing, and the other end carries cams 24 for expanding the brake shoes 26 against the drum 27 when the shaft is turned in accordance with known practice. The proportion of parts is such that an expansion of the diaphragm effects the rotation of the shaft 21 and cams thereon to engage the brake shoes against the drum, and since the diaphragm cells are equally and immediately responsive to pressure in the air line controlled by the valve 12, and since the mediate connections between diaphragm and brake shoe are positive and direct, it follows that a close control of the brakes follows appropriate pressure on the diaphragm.

Figure 3 shows the detailed structure of the control valve, generally designated by the character 12, and with which the flow of fluid under pressure to the diaphragm cells is regulated. The valve may be located at any convenient point but preferably is secured to the steering post 31 by appropriate means such as the strap 32. The valve comprises a housing provided with a cap 33 between which and the main portion of the housing is arranged a diaphragm 34 preferably of heavy sheet rubber, faced on both sides with plates 36 and 37 respectively. The diaphragm divides the space within the housing and cap into two chambers 38 and 39 respectively above and below the diaphragm. Projecting into the lower chamber 39 is a pipe 41 which forms the end, within the valve, of the pipe 11 connected into the receiver 8. As shown in Fig. 5, the pipe 41 is provided with a passage 42 terminating on the under side of the pipe in a valve seat for the needle 43. The needle is arranged on a frame 44, secured at one end to the plate 37, and at the opposite end terminating in a stud surrounded by a spring 46 seating in a depression in the valve housing. The action of the spring therefore tends to force the needle to its seat, in which position the diaphragm is retained by the plate 37 in its normal or unflexed position.

The valve chamber 39 is connected by conduit 9 with the diaphragm cells 14 which are the power applying means. It will be obvious that movement of the needle 43 controls the influx of fluid under pressure to the valve chamber 39 and its passage from thence to the diaphragm cell.

Means are provided for manually controlling the operation of the needle. A control lever 47 is pivoted on the valve and provided with an arm 48 projecting through the cap to engage a plate 49, between which and the plate 36, is interposed a coil spring 51. Adjacent the control lever is a toothed segment 52 adapted to be engaged by a spring pressed latch 53. The lever is provided with a centrally disclosed rod 54 terminating at the end of the lever with a button 56. A spring 57 under the button presses the rod outwardly. A stud 58 projecting from the rod through the side of the lever is adapted to engage the tail of the latch, so that by pressure on the button the latch may be disengaged from the toothed segment to permit free movement of the control lever.

From the above it will be clear that by pulling the lever to the right (of Fig. 3) the spring 51 is placed under tension. As soon as the pressure of this spring overbalances the effective pressure of the spring 46, the needle is unseated and air under pressure flows into the chamber 39 and thence to the diaphragm cell. With the influx of air into the chamber 39, the pressure against the diaphragm 34 tends to seat the needle again to cut off the flow of air into the chamber. Whether or not this occurs depends on the tension in the spring 51. Thus if the lever 47 is pulled over to a certain position, as for instance, that indicated in Fig. 3, air will flow into the chamber and to the diaphragm cell until there is a pressure of, say, 25 pounds to the square inch in the chamber. The pressure against the diaphragm 34 overbalances the pressure of the spring 51 closes the needle valve and prevents further increase in the pressure, which in the instance cited, is that applied to the operation of the brakes. A still greater arc of movement of the control lever, as for example, to the line 59 would cause a tension in the spring 51 which would require a diaphragm pressure of say 40 pounds to overcome. At this pressure, the needle valve would close, preventing further augmentation of the operating pressure. Thus for each position of the control lever there is a corresponding air pressure in the valve, the pressure building up slowly to the given pressure and remaining at that point. Of course the effective pressure in the diaphragm cell 14 corresponds to that in the valve so that the brakes are applied by a pressure gradually augmenting to a predetermined maximum, this maximum being instantly increased by further movement of the control lever, the new position determining a new maximum which may be greater or less than the previous one according to the direction of movement of the lever. Mere pressure will move the control lever to the right (of Fig. 3) engagement of the latch retaining it in position, but for a reverse movement, which will lessen the tension on the spring 51, the latch 53 must be freed from the segment teeth by pressure on the button 56.

Means are provided operating simultaneously with the release of the latch for opening a passage from the chamber 39 to the atmosphere, so that with a release of the air pressure in the valve and diaphragm cell, the springs for disengaging the brake shoes may function. The end of the rod 54 is provided with a conical head 61 forming a valve for closing an aperture in the head of the small valve box 62 fixed on the control lever. The valve box is connected by flexible conduit 63 with the chamber 39. Thus when it is desired to release the brakes and return the control lever to brakes-off position, the button 56 is pressed. This opens the valve 61 and permits the air to exhaust from the valve chamber 39 and at the same time lifts the latch 53 so that the lever is free to be moved to the left (of Fig. 3).

Means are provided for insuring that the valve 61 remain open while the control valve is in the brakes-off position, since it is clear that a very small leakage of air past the needle 43 would eventually set the brakes without movement of the control lever. The end of the toothed segment 52 is provided with a cam finger 64, adapted, when the control lever is pushed over to its extreme brakes-off position to engage the end of the stud 58, and pull it down to hold open the valve 61. Thus, with the control lever in this position, any leakage into the valve chamber 39 escapes into the open air.

From the above it will be clear that the driver may by proper movement of the control lever so control the flow of air from the receiver to the diaphragm cell that the pressure in the cell is gradually augmented to that maximum which his judgment selects as the necessary braking power, and then maintained at that pressure until it is desired to release the brakes. This preselected maximum is usually less than the receiver pressure but obviously it may equal the receiver pressure, if the control lever is moved to compress the spring 51 to such an extent that the load on the diaphragm in opposition to the pressure exerted by the pressure fluid is greater than the force tending to seat the needle.

I claim:

1. A brake apparatus comprising brakes, fluid pressure operated means for actuating said brakes, a source of fluid under pressure, a valve housing, a flexible diaphragm forming a pressure chamber in said housing, a conduit connecting said chamber with said brake actuating means, a conduit connecting said chamber with said source of pressure fluid, a valve connected to said diaphragm for controlling the admission of said pressure fluid into said chamber, a spring for resiliently closing the valve, a second spring engaged with said diaphragm in opposition to said valve closing spring, a control lever for varying the tension of said second spring, means for retaining said lever in adjusted position, and means for releasing said retaining means.

2. A brake apparatus comprising brakes, fluid pressure operated means for actuating said brakes, a source of fluid under pressure, a valve housing, a flexible diaphragm forming a pressure chamber in said housing, a conduit connecting said chamber with said brake actuating means, a conduit connecting said chamber with said source of pressure fluid, a valve connected to said diaphragm for controlling the admission of said pressure fluid into said chamber, a spring for resiliently closing the valve, a second spring engaged with said diaphragm in opposition to said valve closing spring, a control lever for varying the tension of said second spring, means for retaining said lever in adjusted position, and means for simultaneously releasing said retaining means and connecting said pressure chamber with the open air.

3. A brake apparatus comprising brakes, fluid pressure operated means for actuating said brakes, a source of fluid under pressure, a valve housing, a flexible diaphragm forming a pressure chamber in said housing, a conduit connecting said chamber with said brake actuating means, a conduit connecting said chamber with said source of pressure fluid, a valve connected to said diaphragm for controlling the admission of said pressure fluid into said chamber, a spring for resiliently closing the valve, a second spring engaged with said diaphragm in opposition to said valve closing spring, a control lever for varying the tension of said second spring, and means operated during the movement of said lever to one of its extreme positions for connecting said pressure chamber with the open air.

4. A brake apparatus comprising brakes, fluid pressure operated means for actuating said brakes, a source of fluid under pressure, a valve housing, a flexible diaphragm forming a pressure chamber in said housing, a conduit connecting said chamber with said brake actuating means, a conduit connecting said chamber with said source of pressure fluid, a valve connected to said diaphragm for controlling the admission of said pressure fluid into said chamber, a spring for resiliently closing the valve, a second spring engaged with said diaphragm in opposition to said valve closing spring, a control lever for varying the tension of said second spring, means for retaining said lever in adjusted position, and means for simultaneously releasing said retaining means and connecting said pressure chamber with the open air and means operated during the movement of said lever to one of its extreme positions for insuring said connection of the pressure chamber to the open air.

5. A brake apparatus comprising brakes, fluid pressure operated means for actuating said brakes, a source of fluid under pressure, a valve housing, a flexible diaphragm forming a pressure chamber in said housing, a conduit connecting said chamber with said brake actuating means, a conduit connecting said chamber with said source of pressure fluid, a valve connected to said diaphragm for controlling the admission of said pressure fluid into said chamber, a spring for resiliently closing the valve, a second spring engaged with said diaphragm in opposition to said valve closing spring, a control lever for varying the tension of said second spring, a latch for retaining said lever in position, a spring pressed rod for releasing said latch, and a valve operated by said rod for connecting said pressure chamber with the open air.

6. A device for varying the pressure in a fluid pressure operated power applying means, comprising a pressure chamber, a diaphragm closing said pressure chamber, a valve operated by said diaphragm for controlling the admission to said pressure chamber of fluid under pressure, a spring which under tension tends to move the diaphragm to open said valve, a control lever for varying the tension of said spring, a latch for retaining said lever in position, means for releasing said latch, and a valve opened simultaneously with the release of said latch for connecting said pressure chamber with the open air.

7. A device for varying the pressure in a fluid pressure operated power applying means, comprising a pressure chamber, a diaphragm closing said pressure chamber, a valve operated by said diaphragm for controlling the admission to said pressure chamber of fluid under pressure, a spring which under tension tends to move the diaphragm to open said valve, a control lever for varying the tension of said spring, a latch for retaining said lever in position, means for releasing said latch, a valve opened simultaneously with the release of said latch for connecting said pressure chamber with the open air, and means operated during the movement of said lever to one of its extreme positions for opening said valve.

8. In a device of the character described, a pressure chamber, a diaphragm closing said pressure chamber, a passage for fluid under pressure terminating in said chamber, a valve for controlling said passage operatively connected to said diaphragm, a spring for resiliently retaining said valve in the closed position, a second spring for loading said diaphragm in opposition to the pressure thereon exerted by said fluid, a lever for varying the tension of said second spring, a valve for exhausting the pressure fluid from said chamber, and means for automatically opening said latter valve when said lever is moved toward the position of least tension on said second spring.

9. In a device of the character described, a pressure chamber, a diaphragm closing said pressure chamber, a passage for fluid under pressure terminating in said chamber, a valve for controlling said passage operatively connected to said diaphragm, a spring for resiliently retaining said valve in the closed position, a second spring for loading said diaphragm in opposition to the pressure thereon exerted by said fluid, a lever for varying the tension of said second spring, manually releasable means for retaining said lever in adjusted position, a valve for exhausting the pressure fluid from said chamber and means for simultaneously releasing said lever and opening said latter valve.

In testimony whereof, I have hereunto set my hand.

GEORGE S. LANE.